UNITED STATES PATENT OFFICE.

ALFRED SPRINGER, OF CINCINNATI, OHIO.

METHOD OF PRODUCING ALCOHOL.

SPECIFICATION forming part of Letters Patent No. 457,799, dated August 18, 1891.

Application filed May 1, 1889. Serial No. 309,240. (No specimens.)

*To all whom it may concern:*

Be it known that I, ALFRED SPRINGER, a citizen of the United States, residing at Cincinnati, Ohio, have invented new and useful Improvements in Methods for the Production of Alcohol, of which the following is a specification.

My invention relates to improvements in the production of alcohol and commercial spirits, its object being to obtain an increased yield from a given quantity of grain or farinaceous matter, and incidentally a purer product in the absence of the higher alcohols.

To this end my invention consists in treating farinaceous materials—such as the cereals, potatoes, starch of commerce, or grape-sugar (glucose)—with nitric acid, with the object and effect of obtaining for distillation a product more fermentable, both qualitatively and quantitatively, than is obtained in the processes commonly employed in commercial distilleries.

In carrying out my improved process in and with the apparatus employed in ordinary commercial distilleries I preferably employ separate vats or tubs for the nitric-acid solution and the material to be treated, and a convenient arrangement is to locate the nitric-acid tub directly under the grain-tub, so that one may discharge into the other. In the upper vat is placed the farinaceous material, preferably ground, thoroughly steeped in three times its weight of water, and, where whole grain is used, preferably "cooked" in the ordinary manner. The vat into which the dilute acid is placed is an ordinary cooking-tub of suitable material to resist the acid, provided with closed steam-coils and also nozzles for the discharge of steam into the contained mass. Into this vat is placed for each one hundred parts of the grain to be treated one part of commercial nitric acid diluted with fifty parts of water and brought to a state of ebullition and agitation by the steam-coils and the discharge through the nozzles, the latter being regulated so that the gain by condensation of steam approximately equals the loss by evaporation. The farinaceous contents of the upper vat are allowed to flow slowly into the nitric-acid solution while the ebullition and agitation of the mass is continued. This condition is then maintained for six to eight hours, after which the mass is allowed to stand for one day or until the saccharification becomes complete. The conversion can be followed by the "iodine test" for intermediary dextrins and the "alcohol test" for dextrin. After the saccharification is complete I may partially or wholly neutralize the nitric acid, preferably with potassium or ammonium carbonate, preferably employing only one-half the amount necessary to neutralize the original quantity of nitric acid used, so that the mass now ready to undergo fermentation has an acid reaction. The purpose in view here is to keep the peptones in solution also, because an acid medium is best adapted to the propagation of the yeast-cells. It is not absolutely necessary to even partially neutralize the nitric acid, but it is preferable. Yeast is now added, and the remaining processes are similar to those generally employed in distilleries, excepting that just prior to distillation potassium carbonate sufficient to neutralize the remaining nitric acid is added, in order to avoid corrosion of the still and correct the acid reaction of the slop.

As a variant of the process I sometimes add to the usual amount of nitric acid an additional one one-hundredth part of phosphoric acid on account of its beneficial nutritive powers—that is to say, to one hundred parts of grain one part of nitric acid and one one-hundredth part of phosphoric acid.

While my improved process is based on the well-known converting power of acids on starch, I am not aware that it has ever been applied in the manner and for the purposes I have described. For example, sulphuric and hydrochloric, also sulphuric and nitric, acids have been employed in the manufacture of glucose; but in every such case the resulting products were not capable of superseding those obtained by the existing methods of saccharification used in distilleries. In my process, on the other hand, the product is so capable. Not only may malted grain be entirely omitted, but more fermentable products are formed and the products of fermentation are purer. The saccharification being more complete, there are less intermediary and non-fermentable dextrins, and the yield of spirits is therefore increased. Malted grain being omitted or used in reduced quantity, there is less lactic acid and fewer foreign ferments to contaminate the fermenting mass; also, the formation of higher alcohols than the ethyl alcohol is almost totally suppressed. Consequently the final yield of spirits is purer in quality and requires little or no further purification. Also, further, the nitrates themselves acting as nutrients to the yeast-cells, these become more active and require less nutrition to be taken from the grain.

I claim as my invention, and desire to secure by Letters Patent of the United States—

1. The improvement in processes for the production of alcohol, consisting in treating grain or farinaceous material with dilute nitric acid for the conversion of the starch into dextrose, fermenting the mash while wholly or partially retaining the acid, then neutralizing the acid, and distilling the mash in the usual manner, substantially as set forth.

2. The improvement in processes for the production of alcohol, consisting in treating the mash with dilute nitric acid while boiling and agitating the same, fermenting while retaining the acid free or partially neutralized, neutralizing the remaining acid after the fermentation, and then distilling in the usual manner, substantially as set forth.

3. The improvement in processes for the production of alcohol, consisting, first, in gradually discharging the steeped or cooked grain or farinaceous material into a dilute boiling nitric-acid solution and maintaining the ebullition and agitation until saccharification is complete; second, partially neutralizing the nitric acid, leaving the mash with an acid reaction; third, fermenting the mash; fourth, neutralizing the remaining acid, and, fifth, distilling in the usual manner, substantially as set forth.

In testimony whereof I have hereunto set my hand and seal in the presence of two subscribing witnesses.

ALFRED SPRINGER.

Witnesses:
R. M. HOSEA,
ELLA HOSEA.